United States Patent [19]

Herman et al.

[11] Patent Number: 4,536,125
[45] Date of Patent: Aug. 20, 1985

[54] WIND LIFT GENERATOR

[75] Inventors: George R. Herman, 2134 S. Bonarden La., Tempe, Ariz. 85282; William A. Martin, Elma, Wash.

[73] Assignee: George R. Herman, Tempe, Ariz.

[21] Appl. No.: 488,536

[22] Filed: Apr. 25, 1983

[51] Int. Cl.³ .............................................. F03D 5/02
[52] U.S. Cl. .................................................. 415/5; 416/7
[58] Field of Search ........................ 415/5, 2 R–4 R; 416/7, 8, 11, 9, 10

[56] References Cited

U.S. PATENT DOCUMENTS

| | | | |
|---|---|---|---|
| 410,360 | 9/1889 | Ham | 415/4 R |
| 685,016 | 10/1901 | Towsley | 415/5 |
| 763,623 | 6/1904 | Nance | 415/5 X |
| 764,571 | 7/1904 | Fisher | 416/11 X |
| 1,187,601 | 6/1916 | Blackmore | 415/5 X |
| 1,292,389 | 1/1919 | Cook | 416/8 |
| 1,333,987 | 3/1920 | McManigal | 415/4 R |
| 1,502,296 | 7/1924 | Doak | 416/7 |
| 1,502,950 | 7/1924 | Greenbrook | 415/4 R |
| 1,531,964 | 3/1925 | McHenry | 415/4 R |
| 2,409,439 | 10/1946 | Law | 415/4 R |
| 4,049,300 | 9/1977 | Schneider | 416/7 X |
| 4,084,918 | 4/1978 | Pavlecka | 415/4 R |
| 4,449,887 | 5/1984 | Mundhenke | 415/4 R |

FOREIGN PATENT DOCUMENTS

| | | | |
|---|---|---|---|
| 100841 | 6/1897 | Fed. Rep. of Germany | 416/119 |
| 331377 | 1/1921 | Fed. Rep. of Germany | 415/4 R |
| 381102 | 9/1923 | Fed. Rep. of Germany | 416/DIG. 6 |
| 906440 | 3/1954 | Fed. Rep. of Germany | 416/135 A |
| 729524 | 7/1932 | France | 416/8 |
| 2304790 | 10/1976 | France | 415/5 |
| 7900318 | 7/1980 | Netherlands | 416/11 |
| 266468 | 4/1950 | Switzerland | 416/8 |

Primary Examiner—Everette A. Powell, Jr.
Attorney, Agent, or Firm—Baker, Maxham, Callan & Jester

[57] ABSTRACT

A wind lift generator includes a housing structure formed by a pair of spaced apart plates mounted on support structure for pivotal rotation about a vertical axis at the forward end thereof for orienting into the wind, and said plates supporting a plurality of coaxially disposed sprockets arranged to support a pair of spaced apart drive chains in a quadrilateral configuration with lift foils connected and supported between the chains with the quadrilateral chain configuration supporting the chain for an initial lift mode at the forward end of the housing, followed by a direct impact mode extending from the front of the housing upward and backward to the rear of the housing and a negative lift mode extending from the top rear of the housing to the bottom with the vanes returning via a neutral mode to the front of the housing for repeating the lift cycle. A suitable electrical generator is driven from one or more shafts of the assembly driven by the drive chains.

24 Claims, 7 Drawing Figures

WIND LIFT GENERATOR

BACKGROUND OF THE INVENTION

The present invention relates generally to fluid power devices and pertains particularly to a lift-type wind generator.

Due to the enormous increases in the costs of conventional fuel, in recent years a great deal of attention is being directed to little-used forms of energy. One such form of energy which has received a great deal of attention in recent years is that of wind energy. Many forms of devices have been utilized over the ages in an effort to effectively harness the energy of the wind.

Many different forms of windmills have been proposed in the past. Most windmills, however, utilize large rotating blades that are hazardous if not mounted at a substantial height on a tower or the like. One device of interest, however, is the wind lift device which utilizes a plurality of lifting blades or air foils mounted between a pair of chains that are supported on a plurality of sprockets. It is desirable, however, that improvements be made in these lift-type of devices.

SUMMARY AND OBJECTS OF THE INVENTION

It is the primary object of the present invention to provide an improved lift-type fluid generator.

In accordance with the primary aspect of the present invention, a lift-type fluid generator includes a support frame having a plurality of coaxially disposed pairs of support and drive sprockets positioned to support a pair of spaced apart endless chains in a quadrilateral configuration and having a plurality of lift vanes or blades mounted between the two chains with the arrangement and angular positioning of the chains between the support sprockets defining three different power modes of operation with a single neutral return mode.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
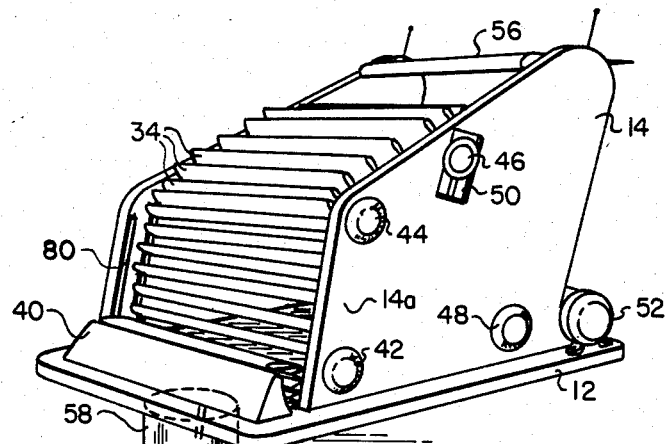
FIG. 1 is a perspective view of a preferred embodiment of the invention.

Referring to the drawings, a wind generator in accordance with the invention, designated generally by the numeral 10 is illustrated. This wind generator comprises a frame or housing support structure comprising a base plate or support member 12 having a pair of spaced apart generally planar vertically disposed support plates 14 and 16 secured thereto and extending upward therefrom. The side plates 14 and 16 serve the additional function of wind vanes forcing the unit to pivot into the wind about its pivot axis.

A plurality of coaxially disposed pairs of sprockets are mounted on support shafts in positions around in a quadrilateral configuration on the side panels 14 and 16. This supports a pair of spaced apart drive chains which support the plurality of lift blades or vanes and positions them in a configuration providing three power modes and a neutral mode as the vanes travel around the track defined by the chains.

Figure 4:
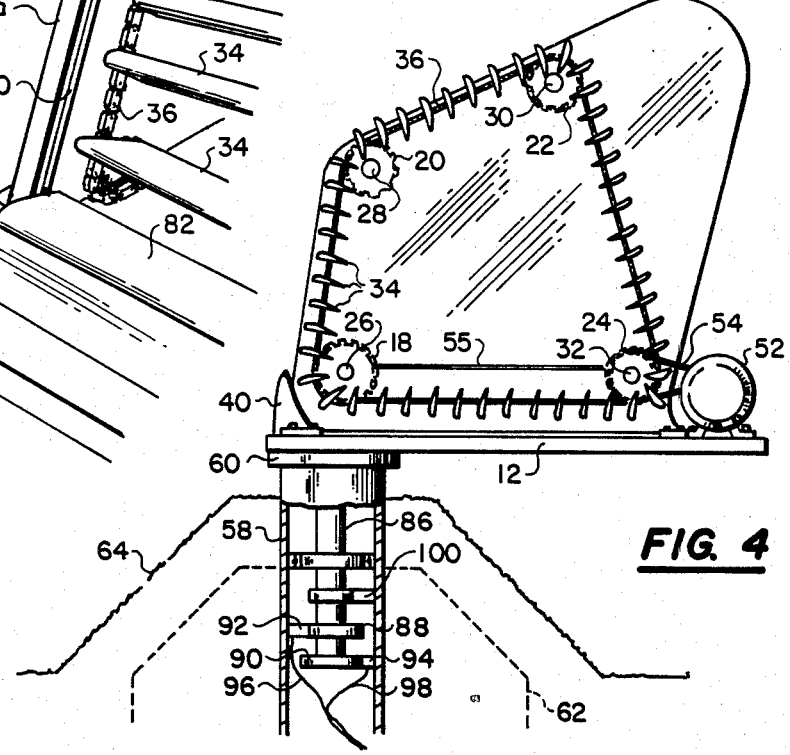
FIG. 4 is a section view taken on line 4—4 of FIG. 3.

Turning more particularly to FIG. 4, a plurality of sprockets 18, 20, 22 and 24 are positioned and mounted on shafts 26, 28, 30 and 32 as illustrated. A plurality of wind blades or vanes in the form of lift foils 34 are mounted on and secured between a pair of chains 36 and 38. The chains 36 and 38 are supported on the respective pairs of sprockets 18 through 24.

As illustrated in FIG. 4, the sprockets are arranged such that the front upper sprocket 20 is positioned to provide an angle of about 7.5° of the chain to provide an optimum lift mode of the blades between the sprockets 18 and 20.

The upper aft sprocket 22 is positioned higher than the forward sprocket 20 and at an angle of approximately 64.5° to the horizon or horizontal to provide the chain and foils a path that presents the face of the foils in a direct impact or sail configuration to the prevailing oncoming fluid. This provides a second or impact power mode of the unit.

The bottom aft sprocket 24 is positioned behind the sprocket 22 to provide a liner path of about 15° angle of the chain and foils therebetween to provide an optimum negative lift of the foils or blades as the fluid passes over them in the reverse direction. This arrangement therefore provides three basic power modes of the unit with a neutral return mode of the blades between the sprockets 24 and 18 which is shielded by a wind shield 40 as the blades move from the sprocket 24 back to the sprocket 18 in preparation to enter the optimum lift mode.

Corresponding coaxial ones of the pairs of the respective sprockets 18, 20, 22 and 24 are mounted on the support panel 14 by respective mounting brackets 42, 44, 46 and 48. The mounting of the pair of sprockets 22 and 46 include chain tension adjusting devices 50 (only one of which is shown) for adjusting the tension in the chain members. Power derived from the unit is utilized to drive a power generating unit such as an electrical generator 52 such as by means of a belt and pulley drive assembly 54 as shown in FIG. 4 and preferably includes a centrifugal or other known type of speed responsive clutch. Other suitable drive arrangements for extracting the power from the unit may be utilized. Transmission of the power from the generator unit 52 may be by way of suitable electrical cables as will be explained.

A cover 55 is mounted in the bottom of the housing just above and covering the blades as they move horizontally toward the front. This cover reduces the drag on the blades that would normally result from air flow through the housing.

The trailing upper edge of each of the panels 14 and 16 as well as the side face of the panels themselves function as wind vanes. An upper stationary foil 56 may be secured between the upper tips of the side walls or panels 14 and 16 as shown in FIG. 1 for aiding in stabilizing the unit. The housing itself will cause a low pressure area down wind thereof resulting in a vortexing effect. This is caused by the frontal resistance to the wind by the lift generator. Therefore, a greater pressure will exist upstream of the generator then down stream thereby improving the efficiency thereof. Also, the mound 64 will direct additional components of the flowing wind into the front of the generator.

Figure 2:
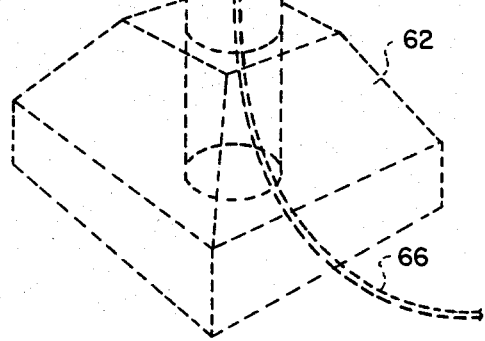
FIG. 2 is a detail view of a lift foil.
Figure 2:

Turning to FIG. 2, a typical blade configuration is illustrated showing the blade to have an aircraft wing-type of foil to provide maximum lift. An optimum design of the foil may be utilized to attain the maximum lift of the blades at least during the initial lift mode. The blades may be constructed with a thin skin of aluminum or other suitable material supported on a support frame such as typical aircraft wing construction. Different materials will be utilized for different fluids. For example, dacron or a similar material may be used for a wind machine with noncorrosive metal or plastics used for a water machine.

Figure 3:
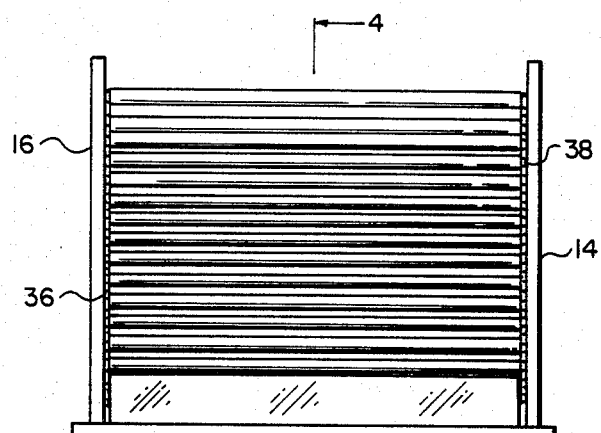
FIG. 3 is front elevation view of the embodiment of FIG. 1.

The entire unit is pivotally supported on a suitable support pedestal comprising a vertical support column 58 and associated supporting bearing means 60 secured directly to the support frame member 12. This bearing assembly is secured at the front center portion of the frame or plate member 12 such that any fluid force acting on the panels 14 and 16 will pivot the entire unit to a heading into the fluid flow. The pedestal for a wind mounted generator as shown in FIGS. 1 through 4 may include a column as illustrated anchored such as in a underground block of cement or the like 62. The base 12 is preferably positioned partially beneath the ground and mounded over as shown in FIG. 3 thereby presenting a fairly low profile, yet above ground unit as shown in FIGS. 3 and 4.

Power from the electric generator is communicated by way of a slip conductor arrangement (FIG. 4) to power cable 66 running down the support column 58 and into a suitable underground tunnel or cableway as desired. A port 86 secured to platform 12 to rotate therewith is mounted in bearings in the upper end of stationary post 58. Conductor wires (not shown) extend from generator 52 down through port 86 and are connected to conductor rings 88 and 90 which are insulated from port 86. A pair of slip conductors 92 and 94 engage the respective conductor rings to communicate electrical current to conductor wires 96 and 98 of the power cable. A ground conductor 100 provides ground for the system.

In operation, as a wind generator, the unit or a plurality thereof is suitably mounted in open spaces with the unit free to swing into the wind. A wind having a suitable velocity of, for example, in excess of 10 miles per hour will force the unit to swing into the prevailing wind with the wind acting on the lift blades to activate the unit forcing the blades 34 to traverse around the track driving the electric generator 52. In certain areas where high velocity winds may be experienced, a suitable governing apparatus may be necessary.

Figure 5:
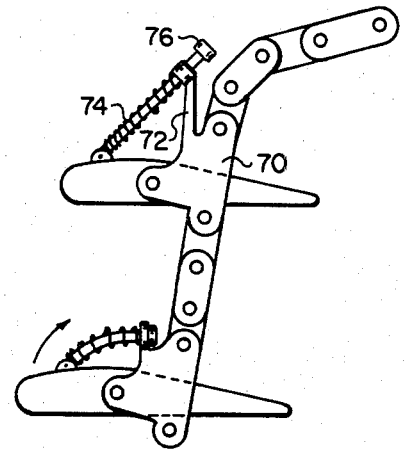
FIG. 5 is a side view of a form of governor.

Referring to FIG. 5, a form of governor is illustrated which comprises, essentially, a pivot mounting of the blades with a bracket 70 attached directly to or incorporated into the chain and including an arm 72 for resiliently supporting a spring 74 in arrangement with a biasing rod 76 for resiliently maintaining the blade 34 in an optimum position. When excess wind engages the blade 34, the blade pivots upward to a stalled position, thus dumping the lift effect, thereby providing a controlled governing of the speed of the unit.

Figure 6:
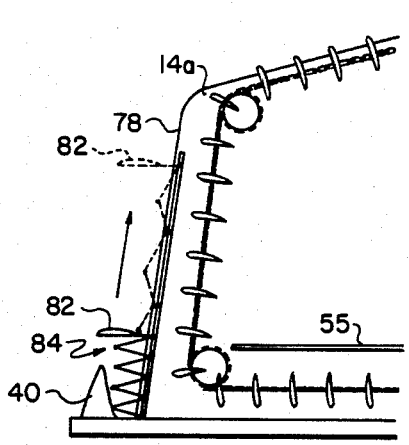
FIG. 6 is a side view of an alternate embodiment of a governor.
Figure 7:
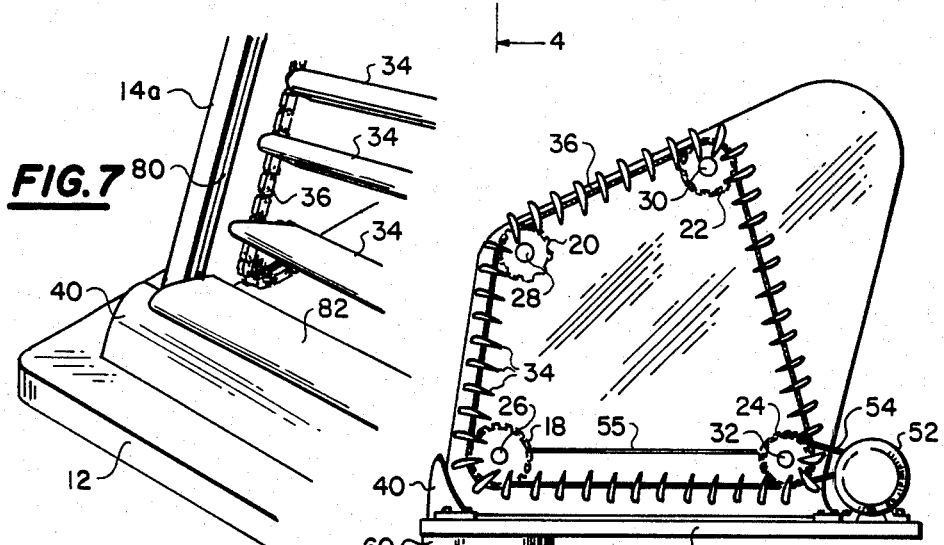
FIG. 7 is a perspective view of the governor of FIG. 6.

Turning to FIGS. 6 and 7, an alternate embodiment of a governor is illustrated. This embodiment includes a pair of tracks 78 and 80 extending along extended forward edge of the housing panels 14a and 16a that extend forward of the blades. A lift vane or blade 82 is mounted to ride upward along the rails and lift an accordion-type folded cover or closure unit 84 that is folded in a stacked position just below the blade 82 in front of the wind screen 40. As the wind velocity increases to undesirable levels, the force acting on the lift blade 82 will lift the hinged or accordion-type cover 84 like a curtain covering a proportionate number of the vanes or blades 34 thereby shielding them from the effects of the wind. This effectively provides a governor responsive to the wind velocity for preventing excess speed to develop in the unit.

The device of the present invention may be utilized in any flowing fluid, such as the wind or water such as rivers and streams, or even irrigation canals and the like. With the self-aligning or directional aligning feature it can also be used in harbors and inlets where it may be activated by the currents of flowing tides. The unit may also be utilized in areas of the ocean wherein currents prevail.

While we have illustrated and described our invention by means of specific embodiments, it is to be understood that numerous changes and modification may be made therein without departing from the spirit and scope of the invention as defined in the appended claims.

We claim:

1. A fluid power generator comprising:
    a support frame,
    a plurality of coaxially disposed pairs of support and drive sprockets rotatably mounted in spaced relations on said frame,
    a pair of spaced apart endless chains mounted on separate ones of said pairs of said sprockets, and
    a plurality of fluid responsive lift blades mounted on and extending between said chains, said sprockets being positioned to define a first lift stage of said blades followed by an impact stage, and a downward lift stage, and a neutral stage on said support frame to be oriented by said support into a predetermined fluid stream wherein each of said stages presents a plurality of blades to said fluid stream.

2. The fluid power generator of claim 1 wherein said frame is mounted for pivotal movement on a vertical axis for self-orientation into a direction of fluid flow.

3. The fluid generator of claim 2 wherein said frame is defined by a pair of spaced apart vertically oriented planar panels defining directional vanes for orienting said frame into a direction of fluid flow.

4. The fluid generator of claim 3 wherein said first lift stage of said blades are defined by a path sloped at an angle of about 7.5° from the vertical.

5. The fluid generator of claim 3 wherein said impact stage is defined by a path of said blades traveling at an angle of about 64.5° to the horizontal.

6. The fluid generator of claim 3 wherein said downward lift stage is defined by a path of said blades traveling at an angle of about 15° to the vertical.

7. The wind generator of claim 4 wherein said impact lift stage is defined by a path of said blades traveling at an angle of about 64.5° to the horizontal.

8. The fluid power generator of claim 7 wherein said downward lift stage is defined by said blades traveling in a path at about an angle of about 15° to the vertical.

9. The fluid power generator of claim 8 including an electrical generator driven by at least one of said sprockets.

10. A wind power generator, comprising:
a support frame pivotally mounted for self-orientation into an air stream of a prevailing wind,
a pair of spaced apart endless chains mounted for continuous movement in spaced quadrilateral paths defining an uplift path, an impact path, a down lift path and a neutral path, and
a plurality of air foils connected between said chains in each of said paths and extending into said air stream for driving said chains along said paths for driving said chains along said paths in response to a flow of air acting on said foils.

11. The wind generator of claim 10 wherein the uplift path is sloped at an angle of about 7.5° from the vertical.

12. The wind generator of claim 11 wherein the impact path is at an angle of about 64.5° to the horizontal.

13. The wind generator of claim 12 wherein the downlift path extends at an angle of about 15° to the vertical.

14. The wind generator of claim 13 wherein said support frame is defined by a pair of spaced apart vertically disposed planar panels.

15. The wind generator of claim 14 wherein the angle of transition between the uplift and impact path is lesser than 90°.

16. The wind generator of claim 15 further comprising speed control means for partially negating the effect of wind on said blades for thereby controlling the speed thereof.

17. The wind generator of claim 16 wherein said speed control means comprises pivot mounting means for pivotally mounting said blades to said chains, and
resilient means for biasing said blades to a normal lift position and for permitting said blades to pivot to a stall position under excess fluid force.

18. The wind generator of claim 16 wherein said speed control means comprises movable shield means for moving between a neutral nonshielding position relative to said blades and a shielding position.

19. The wind generator of claim 18 wherein said shield means comprises a foldable cover moveable to a shielding position of said blades in said uplift path for at least partially negating the effect of wind on said blades thereby controlling the speed thereof.

20. The wind generator of claim 19 wherein said cover is mounted on a pair of parallel tracks, and includes a wind responsive wind blade mounted on said track for lifting said cover to said shielding position.

21. A fluid power generator comprising:
a support frame that is pivotally mounted on a vertical axis located substantially at the front of the device and said frame is defined by a pair of spaced apart vertically-oriented planar panels defining directional vanes for self-orientation of the device into a direction of fluid flow of a fluid stream;
a plurality of coaxially disposed pairs of support and drive sprockets rotatably mounted in spaced relations on said frame;
a pair of spaced apart endless chains mounted on separate ones of said pairs of said sprockets; and
a plurality of fluid responsive lift blades mounted on and extending between said chains, said sprockets being positioned to define a first lift stage of said blades followed by an impact stage, a downward lift stage, and a neutral stage wherein each of said stages is defined by a plurality of blades extending into and acted on simultaneously by a common fluid stream.

22. A wind power generator comprising:
a support frame that is pivotally mounted on a vertical axis that is located substantially at the front of the device and said frame is defined by a pair of spaced apart vertically-oriented planar panels defining directional vanes for self-orientation of the device into a direction of wind flow;
a pair of spaced apart endless chains mounted for continuous movement in spaced quadrilateral paths defining an uplift path, an impact path, a downlift path, and a neutral path; and
a plurality of air foils in each of said paths connected between said chains for driving said chains along said paths in response to a flow of air acting on said foils.

23. The wind generator of claim 22 including an electrical generator driven by at least one of said chains.

24. The wind generator of claim 22 wherein said vertical axis is a hollow column to accommodate passage of electrical communication means with the device.

* * * * *